(12) United States Patent
Illés et al.

(10) Patent No.: US 10,641,369 B2
(45) Date of Patent: May 5, 2020

(54) BALL RETURN MEANS WITH A FASTENING SLEEVE WHICH CAN BE MOUNTED AXIALLY

(71) Applicants: THYSSENKRUPP PRESTA AG, Eschen (LI); thyssenkrupp AG, Essen (DE)

(72) Inventors: András Illés, Gams (CH); Wolfram Raither, Buchs (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 155 days.

(21) Appl. No.: 15/768,988

(22) PCT Filed: Oct. 18, 2016

(86) PCT No.: PCT/EP2016/074965
§ 371 (c)(1),
(2) Date: Apr. 17, 2018

(87) PCT Pub. No.: WO2017/067921
PCT Pub. Date: Apr. 27, 2017

(65) Prior Publication Data
US 2018/0306286 A1 Oct. 25, 2018

(30) Foreign Application Priority Data
Oct. 22, 2015 (DE) .......................... 10 2015 013 648

(51) Int. Cl.
*F16H 25/22* (2006.01)
*B62D 5/04* (2006.01)

(52) U.S. Cl.
CPC ....... *F16H 25/2223* (2013.01); *B62D 5/0448* (2013.01); *F16H 25/2214* (2013.01)

(58) Field of Classification Search
CPC .. B62D 5/0424; B62D 5/0427; B62D 5/0448; F16H 25/2223; F16H 25/2214; F16H 25/2219
(Continued)

(56) References Cited

U.S. PATENT DOCUMENTS

| 5,094,119 | A | 3/1992 | Virga |
| 5,142,929 | A | 9/1992 | Simpson, III |
(Continued)

FOREIGN PATENT DOCUMENTS

| CN | 101655145 A | 2/2010 |
| CN | 101927784 A | 12/2010 |
(Continued)

OTHER PUBLICATIONS

English Translation of International Search Report issued in PCT/EP2016/074965, dated Dec. 7, 2016 (dated Dec. 14, 2016).

*Primary Examiner* — David H Bollinger
(74) *Attorney, Agent, or Firm* — thyssenkrupp North America, LLC.

(57) ABSTRACT

A power steering system for a motor vehicle may include a servomotor, which drives an axially-movable rack via a ball nut. The ball nut may be mounted in a bearing such that the ball nut can be rotated in a housing. The ball nut engages with a threaded spindle formed on the axially-movable rack and has a ball screw thread on an inside thereof for balls to roll on. An external ball return means may connect a beginning of the ball screw thread to an end of the ball screw thread to allow endless circulation of the balls. A deflector and a sleeve may form a return channel of the ball return means.

11 Claims, 2 Drawing Sheets

(58) Field of Classification Search
USPC .................................................. 180/443, 444
See application file for complete search history.

(56) References Cited

U.S. PATENT DOCUMENTS

| | | |
|---|---|---|
| 2010/0043583 A1 | 2/2010 | Fukano |
| 2010/0282011 A1 | 11/2010 | Nishimura |
| 2010/0319471 A1 | 12/2010 | Nam |
| 2011/0139536 A1 | 6/2011 | Kontner |
| 2011/0247891 A1 | 10/2011 | Meyer |
| 2012/0024616 A1 | 2/2012 | Birkwald |
| 2012/0298439 A1 | 11/2012 | Ji |
| 2013/0247701 A1 | 9/2013 | Kiforiuk |
| 2014/0174222 A1 | 6/2014 | Kiforiuk |
| 2015/0284020 A1* | 10/2015 | Asakura .............. F16H 25/2204 180/444 |
| 2015/0336605 A1* | 11/2015 | Vorwerck ............. B62D 5/0424 180/444 |

FOREIGN PATENT DOCUMENTS

| | | |
|---|---|---|
| DE | 11 2008 003 181 T | 1/2011 |
| DE | 102010025589 A | 12/2011 |
| DE | 102010054134 B | 4/2012 |
| DE | 102013213957 A | 3/2014 |
| DE | 102012019227 A | 4/2014 |
| DE | 102013006432 A | 10/2014 |
| DE | 102014006469 A | 7/2015 |
| EP | 1659312 A | 5/2006 |
| FR | 1394136 A | 4/1965 |
| FR | 1436798 A | 4/1966 |
| GB | 2014270 A | 8/1979 |

\* cited by examiner

BALL RETURN MEANS WITH A FASTENING SLEEVE WHICH CAN BE MOUNTED AXIALLY

CROSS REFERENCE TO RELATED APPLICATIONS

This application is a U.S. National Stage Entry of International Patent Application Serial Number PCT/EP2016/074965, filed Oct. 18, 2016, which claims priority to German Patent Application No. DE 10 2015 013 648.8, filed Oct. 22, 2015, the entire contents of both of which are incorporated herein by reference.

FIELD

The present disclosure generally relates to power steering systems for motor vehicles, including power steering systems that have a servomotor that drives an axially-movable rack.

BACKGROUND

Ball screw mechanisms are used to convert a rotary motion into a longitudinal motion or vice versa. In steering systems of a motor vehicle having an electric-motor servo drive which acts via a ball screw mechanism, the rack has a section which is designed as a threaded spindle. Arranged on the threaded spindle is a ball nut, which is mounted rotatably on the threaded spindle by means of balls. A servomotor drives the ball nut via a gear mechanism in order to provide electric-motor support for a longitudinal movement of the rack. The rack with a section for the threaded spindle is accommodated in a housing. The ball nut is rotatably mounted in this housing by means of a rolling bearing. The rolling bearing has an outer ring and an inner ring.

DE 10 2010 054 134 discloses a plastic sleeve which is slid over the ball nut to radially secure an external ball return means. On its inside, the sleeve has arcuate and resilient supporting regions, which rest on the ball nut. One disadvantage of a sleeve of this kind is its complex production process. Also disclosed is a tubular deflector, which conveys the balls back into the ball nut. This tubular return means takes up additional installation space, which is regarded as disadvantageous.

EP 1 659 312 B1 discloses a ball screw mechanism in which the plastic deflectors are inserted into the main body from outside. Here, the deflectors project beyond the outer circumference of the metal main body of the ball nut. To fasten the deflectors in the ball nut, apertures are provided in the inside of the toothed belt pulley. This direct fastening of the deflectors on the toothed belt pulley has the disadvantage that parts of the pulley can get between the main body and the deflectors and hinder or block the rotation of the ball nut if the toothed belt snaps.

Thus a need exists for a power steering system having a ball screw mechanism in which the ball return means takes up little installation space and is simple to produce, and the vehicle should remain steerable even if the toothed belt snaps.

DETAILED DESCRIPTION

Figure 1:
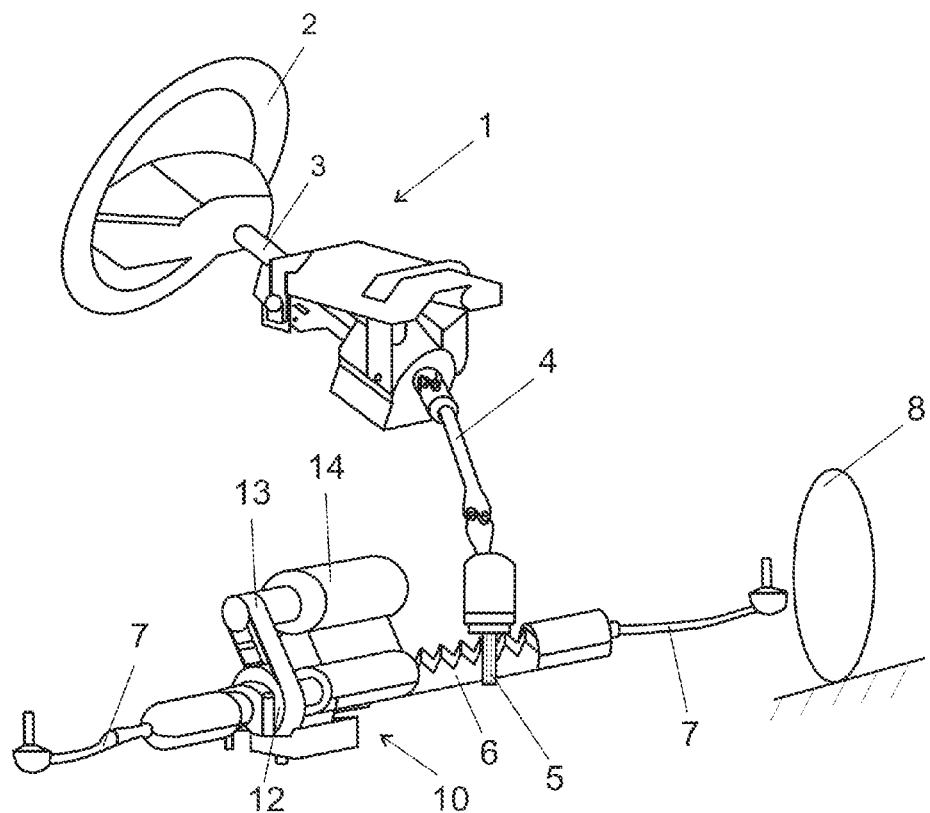
FIG. 1 is a schematic view of an example motor vehicle steering system having an electric-motor servo drive.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

A power steering system is provided for a motor vehicle, which in some examples may include a servomotor, which drives an axially movable rack via a ball nut, which is mounted in a bearing such that it can be rotated in a housing. The the ball nut may be in engagement with a threaded spindle formed on the rack and has a ball screw thread on the inside thereof for balls to roll on. The power steering system may further include an external ball return means, which connects the start of the ball screw thread to the end of the ball screw thread to allow endless circulation of the balls. Still further, the power steering system may include, a deflector and a sleeve, wherein a return channel of the ball return means is formed by the deflector and the sleeve. The sleeve thus has two functions: the partial formation of the return channel and the fastening of the deflector.

The return channel is preferably divided between the deflector and the sleeve in the outer contact plane of the balls. The outer contact plane of the balls is the region which forms the connecting surface between the ball and the sleeve but is not in contact with the adjacent balls or with the return channel.

The deflector preferably has an aperture, which forms an open return channel. It is advantageous here if the sleeve to be slid axially onto the ball nut and the deflector closes off the open return channel.

The ball nut preferably has two apertures for the entry and exit of balls for external return to the opposite end of the ball screw thread.

In an advantageous embodiment, the deflector has pins for positioning the deflector on the ball nut. The pins preferably engage in the apertures of the ball nut and thus position or secure the deflector on the ball nut.

The sleeve preferably surrounds the ball nut and the deflector fitted onto the ball nut and thus secures the deflector on the ball nut.

It is advantageous if the deflector has two further apertures, which are each arranged laterally with respect to the aperture of the return channel and parallel to said channel. By means of these apertures it is possible to save weight.

The longitudinal section through the return channel is preferably not circular but U-shaped. In this way, the sleeve is provided with a cross section which makes it possible to mount the sleeve in the axial direction.

It is advantageous if the sleeve has a cylindrical geometry.

In FIG. 1, an electromechanical motor vehicle steering system 1 having a steering wheel 2, which is coupled for conjoint rotation to an upper steering shaft 3 and a lower steering shaft 4, is illustrated schematically. The lower steering shaft 4 is connected for conjoint rotation to a pinion 5. The pinion 5 meshes in a known manner with a toothed segment of a rack 6. The rack 6 is mounted in a steering housing in such a way that it can be moved in the direction of its longitudinal axis. At its free end, the rack 6 is connected to steering rods 7 via ball joints (not shown). The steering rods 7 themselves are each connected to a steered wheel 8 of the motor vehicle in a known manner via steering knuckles. Rotation of the steering wheel 2 leads, through the connection of the steering shaft 3, 4 and of the pinion 5, to a longitudinal movement of the rack 6 and hence to pivoting of the steered wheels 8. Provided on the outer side of the rack 6 is a ball screw thread 9, which is part of a ball screw mechanism 10, which furthermore comprises a ball nut 11 with balls 18 circulating therein. The ball nut 11 is connected for conjoint rotation to a belt pulley 12, which is engaged positively on its circumferential side by a toothed belt 13. This toothed belt 13 is driven by a servomotor 14. The ball nut 11, in turn, is mounted in such a way as to be rotatable and axially fixed in the steering housing (not shown) by means of a ball bearing.

In a manner known per se, the servomotor 14 is controlled by means of a signal, derived from the torque in the steering column, in order to assist the steering movement. The servomotor 14 is set in rotation and, via the toothed belt 13 and the ball nut 11, ultimately drives the rack 6. The required manual torque at the steering wheel 2 is thus reduced.

Figure 2:
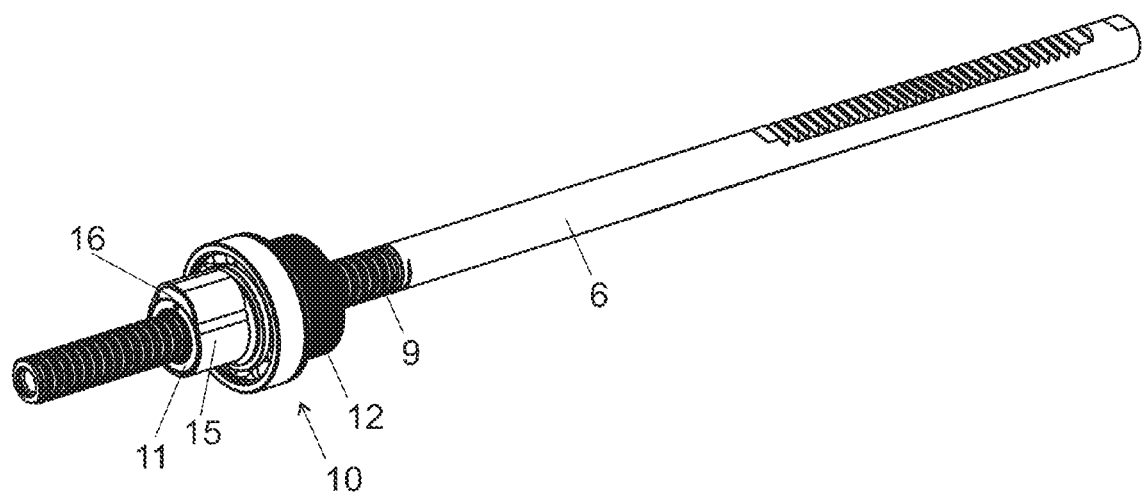
FIG. 2 is a perspective view of an example rack having a ball screw mechanism and a belt pulley.
Figure 3:
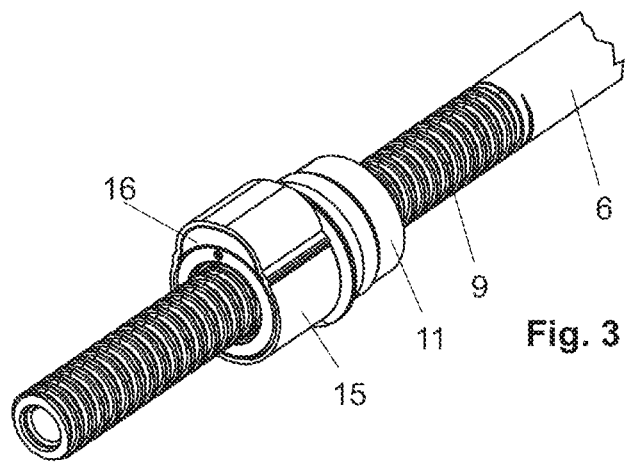
FIG. 3 is a perspective view of the example rack from FIG. 2 without the belt pulley.

Details of an electrically driven motor vehicle power steering system according to the invention are illustrated in FIG. 2 and FIG. 3. The details show the rack 6 with the ball screw thread 9 and the ball screw mechanism 10 arranged thereon, on the one hand with belt pulley 12 and, on the other hand, without the belt pulley. The ball nut 11 and a deflector 16 mounted on the ball nut 11 are surrounded circumferentially by a sleeve 15.

Figure 4:
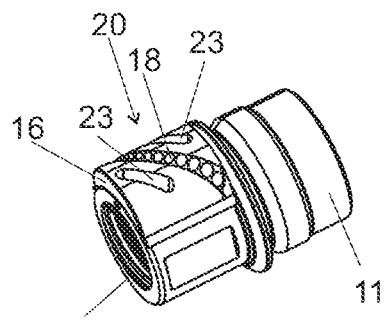
FIG. 4 is a perspective view of an example deflector disposed on a ball nut.
Figure 5:
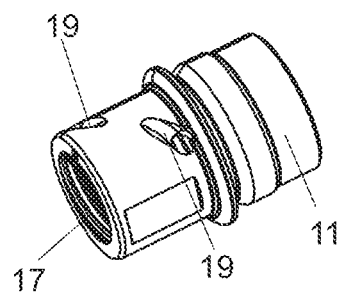
FIG. 5 is a perspective view of the example ball nut from FIG. 4 without a sleeve.
Figure 6:
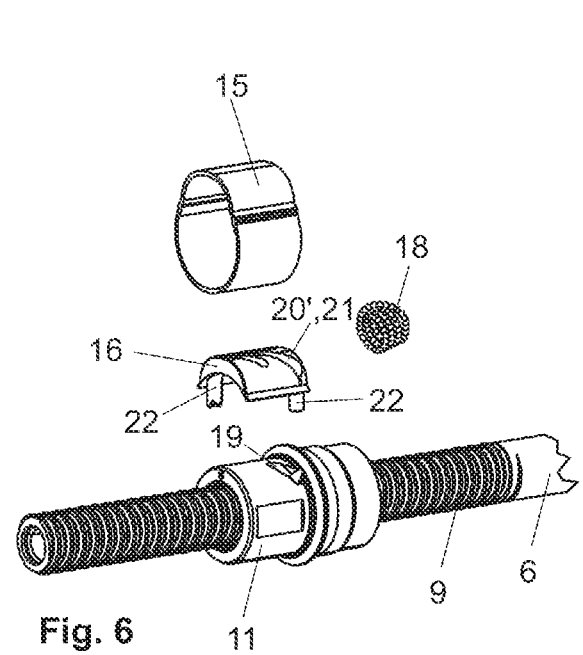
FIG. 6 is an exploded view of an example ball screw mechanism.

The ball nut 11 is shown with the deflector 16 mounted in FIG. 4 and without the deflector 16 in FIG. 5. On its inside, the ball nut 11 carries a ball screw thread 17, in which balls 18 roll in a manner known per se. The ball nut 11 has two through apertures 19. One aperture 19 is provided for the entry of balls 18 and one for the exit of balls 18 for the external ball recirculation means 20 leading to the opposite end of the ball screw thread 17. The ball recirculation means 20, which connects the two apertures 19 to one another, is formed at least partially by the deflector 16. The ball recirculation means 20 is of U-shaped design. The recirculation channel 20' is formed at least partially by an aperture 21 in the deflector 16 and two pins 22 adjoining this. The aperture 21 is arranged diagonally over the deflector 16, which is matched as a mounted component on its inside to the curvature of the upper side of the ball nut 11 and extends in the circumferential direction over a limited sector of the ball nut 11. As shown in FIG. 6, the deflector 16 is inserted into the two apertures 19 of the ball nut 11 by means of the pins 22, with the result that the ball recirculation means 20 is connected to both ends of the ball screw thread 17.

The recirculation channel 20' is closed by the sleeve 15. As a result, the balls 18 can move along the U-shaped path and are held in the channel. The division of the recirculation channel 20' between the deflector 16 and the sleeve 15 extends in the outer contact plane of the balls 18. During assembly, the deflector 16 is first of all placed on the ball nut 11, and the sleeve 15 is then slid axially onto the ball nut 11. The assembly effort is thus very small.

Figure 7:
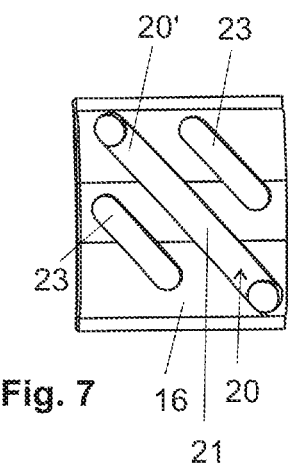
FIG. 7 is a top view of the example deflector in FIG. 4.

The deflector 16 is illustrated in FIG. 7. In addition to the U-shaped recirculation channel 20', the deflector 16 has two further U-shaped apertures 23, which are each arranged laterally with respect to the recirculation channel of 20' and parallel thereto. These apertures 23 serve to optimize the weight.

The ball screw mechanism according to the invention has a U-shaped ball return means with a small requirement for installation space. The ball recirculation means is formed by a deflector and a sleeve. In this arrangement, the parting plane between the deflector and the sleeve extends in the outer contact plane of the balls, with the result that the deflector and the sleeve have a particularly simple geometry and the sleeve can be produced as a continuous semifinished product.

What is claimed is:

1. A power steering system comprising:
   an axially-movable rack having a threaded spindle formed thereon;
   a ball nut that is mounted in a bearing so as to be rotatable in a housing, wherein the ball nut is engaged with the threaded spindle formed on the axially-movable rack, wherein an inside of the ball nut comprises a ball screw thread on which balls are configured to roll;
   a servomotor that drives the axially-movable rack via the ball nut; and
   an external ball return comprising a deflector and sleeve separate from the ball nut, the external ball return configured to form a return channel external to the ball nut and connect a beginning of the ball screw thread to an end of the ball screw thread to allow endless circulation of the balls.

2. The power steering system of claim 1 wherein a division of the return channel between the deflector and the sleeve extends in an outer contact plane of the balls.

3. The power steering system of claim 1 wherein the deflector includes an aperture that forms the return channel.

4. The power steering system of claim 3 wherein the sleeve to be slid axially onto the ball nut and the deflector close off the return channel.

5. The power steering system of claim 1 wherein the deflector includes pins for positioning the deflector on the ball nut.

6. The power steering system of claim 1 wherein the ball nut includes two apertures through which balls are configured to enter and exit for external return to an opposite end of the ball screw thread.

7. The power steering system of claim 6 wherein the deflector includes pins for positioning the deflector on the ball nut, the pins engaging in the apertures of the ball nut.

8. The power steering system of claim 1 wherein the sleeve surrounds the ball nut and the deflector fitted onto the ball nut and secures the deflector on the ball nut.

9. The power steering system of claim 1 wherein the deflector comprises:
   a first aperture that forms the return channel; and
   a second aperture and a third aperture that are disposed laterally with respect to the first aperture and parallel to the return channel.

10. The power steering system of claim 1 wherein the external ball return means is U-shaped.

11. The power steering system of claim 1 wherein the sleeve is cylindrical.

\* \* \* \* \*